(12) United States Patent
Weintraub et al.

(10) Patent No.: US 8,385,331 B2
(45) Date of Patent: Feb. 26, 2013

(54) SECURE AND RELIABLE POLICY ENFORCEMENT

(75) Inventors: Michael A. Weintraub, Medfield, MA (US); David E. Young, Silver Spring, MD (US); Nabil Bitar, Acton, MA (US); Rajesh Yadav, Ashland, MA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 1281 days.

(21) Appl. No.: 11/537,196

(22) Filed: Sep. 29, 2006

(65) Prior Publication Data

US 2008/0080493 A1   Apr. 3, 2008

(51) Int. Cl.
*H04L 12/28* (2006.01)
*H04L 29/06* (2006.01)
*G06F 9/00* (2006.01)

(52) U.S. Cl. ............... 370/389; 370/395.1; 713/152; 726/13; 726/14; 726/15

(58) Field of Classification Search ................. None
See application file for complete search history.

(56) References Cited

U.S. PATENT DOCUMENTS

| | | | | |
|---|---|---|---|---|
| 2004/0196843 | A1* | 10/2004 | Zinin | 370/389 |
| 2004/0202171 | A1* | 10/2004 | Hama | 370/395.1 |
| 2006/0070122 | A1* | 3/2006 | Bellovin | 726/14 |
| 2006/0179031 | A1* | 8/2006 | Lewis | 707/1 |
| 2006/0253900 | A1* | 11/2006 | Paddon et al. | 726/11 |
| 2007/0025537 | A1* | 2/2007 | Claudatos et al. | 379/202.01 |
| 2007/0180225 | A1* | 8/2007 | Schmidt | 713/152 |
| 2007/0203970 | A1* | 8/2007 | Nguyen | 709/201 |

\* cited by examiner

*Primary Examiner* — Brandon Renner

(57) ABSTRACT

A system includes a policy enforcement point that is located within a first network. The policy enforcement point is configured to connect the first network to a second network via a secure connection. The policy enforcement point is configured to receive traffic from a first device via the first network or a second device associated with the second network via the secure connection, determine whether to apply a policy to the received traffic, and discard the received traffic when a policy is determined to apply to the received traffic.

22 Claims, 10 Drawing Sheets

SECURE AND RELIABLE POLICY ENFORCEMENT

BACKGROUND INFORMATION

People connect to networks on a daily basis to obtain information of interest, to shop for goods and services, to communicate with friends, family, and co-workers (e.g., via the telephone, e-mail, instant messaging, etc.), and to obtain television programming. Controlling access to networks, especially in a residential environment, using mechanism(s) that cannot be circumvented by the end user and his/her services or devices is a difficult endeavor.

BRIEF DESCRIPTION OF THE DRAWINGS

The accompanying drawings, which are incorporated in and constitute a part of this specification, illustrate one or more embodiments of the invention and, together with the description, explain the invention. In the drawings.

DETAILED DESCRIPTION OF PREFERRED EMBODIMENTS

The following detailed description of implementations consistent with principles of the invention refers to the accompanying drawings. The same reference numbers in different drawings may identify the same or similar elements. Also, the following detailed description does not limit the invention. Instead, the scope of the invention is defined by the appended claims and their equivalents.

Figure 1:
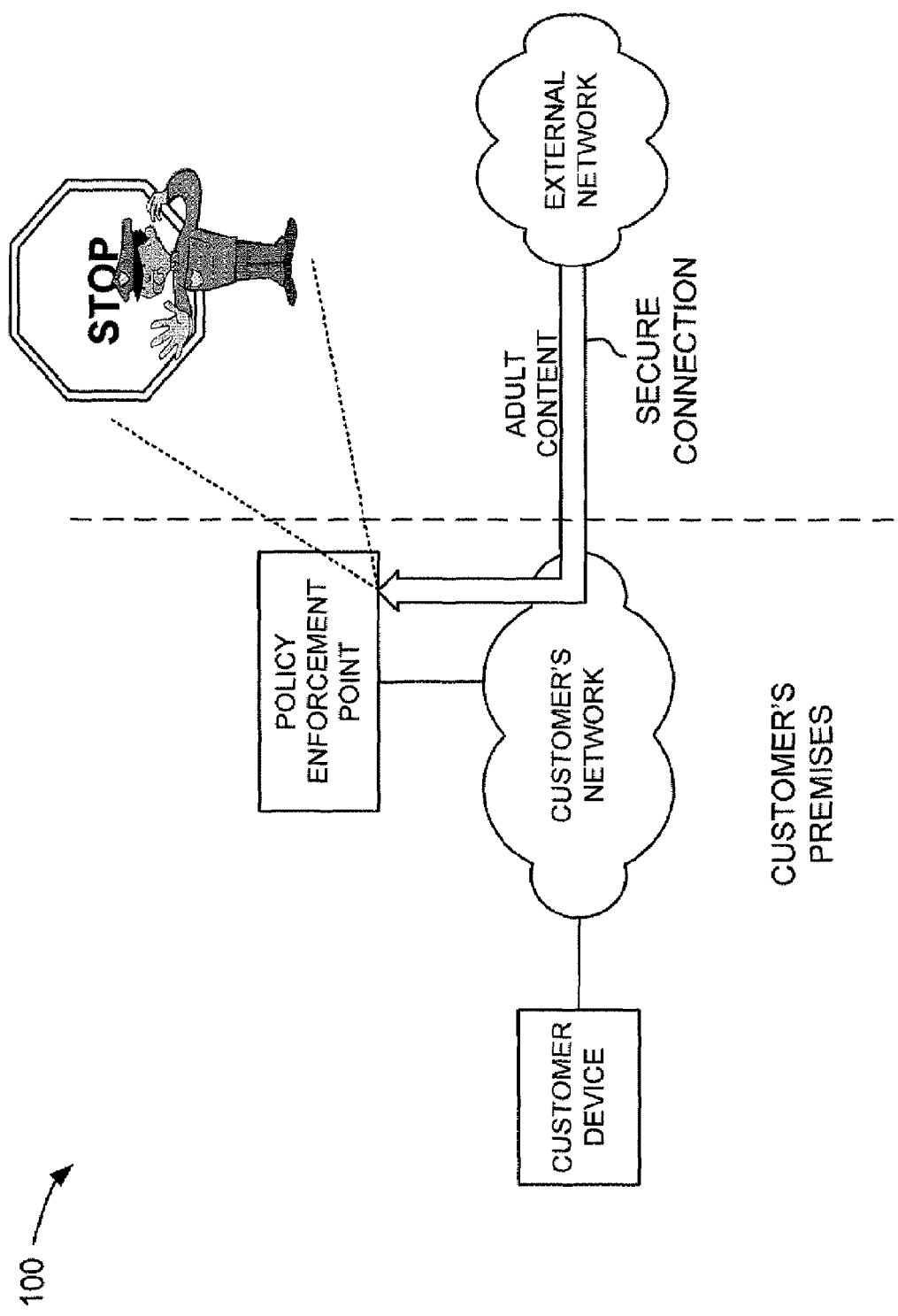
FIG. 1 illustrates an exemplary concept consistent with principles of the invention.

FIG. 1 illustrates an exemplary concept consistent with principles of the invention. As illustrated, a policy enforcement point may be located within a customer's premises, which in FIG. 1, includes the customer's network, the customer device(s), and the policy enforcement point. A secure connection may be established between the policy enforcement point and an external network. Traffic to/from the customer's premises that does not pass through the secure connection may be discarded, thus ensuring that all traffic to/from the external network passes through the policy enforcement point. In this way, the policy enforcement point may enforce customer-defined policies with respect to all traffic entering or leaving the customer's premises. For example, assume that the customer stores a policy in the policy enforcement point that prohibits a customer device within the customer's premises from accessing adult content from the external network. When traffic containing adult content is received from the external network, as illustrated in FIG. 1, the policy enforcement point may stop the traffic (e.g., by discarding it) prior to reaching the customer device. Likewise, the policy enforcement point may stop the request for adult content (e.g. by discarding it or redirecting it) prior to sending it on to the external network.

The customers premises may refer to a household where a parent wishes to control, via the policies, the content that may be provided to his/her children or access to communications. Alternatively, the customer's premises may refer to a business where an administrator wants to control, via the policies, the content that may be provided to their employees or access to communications. The customer's premises may refer to other types of premises in other implementations consistent with principles of the invention.

Figure 2:
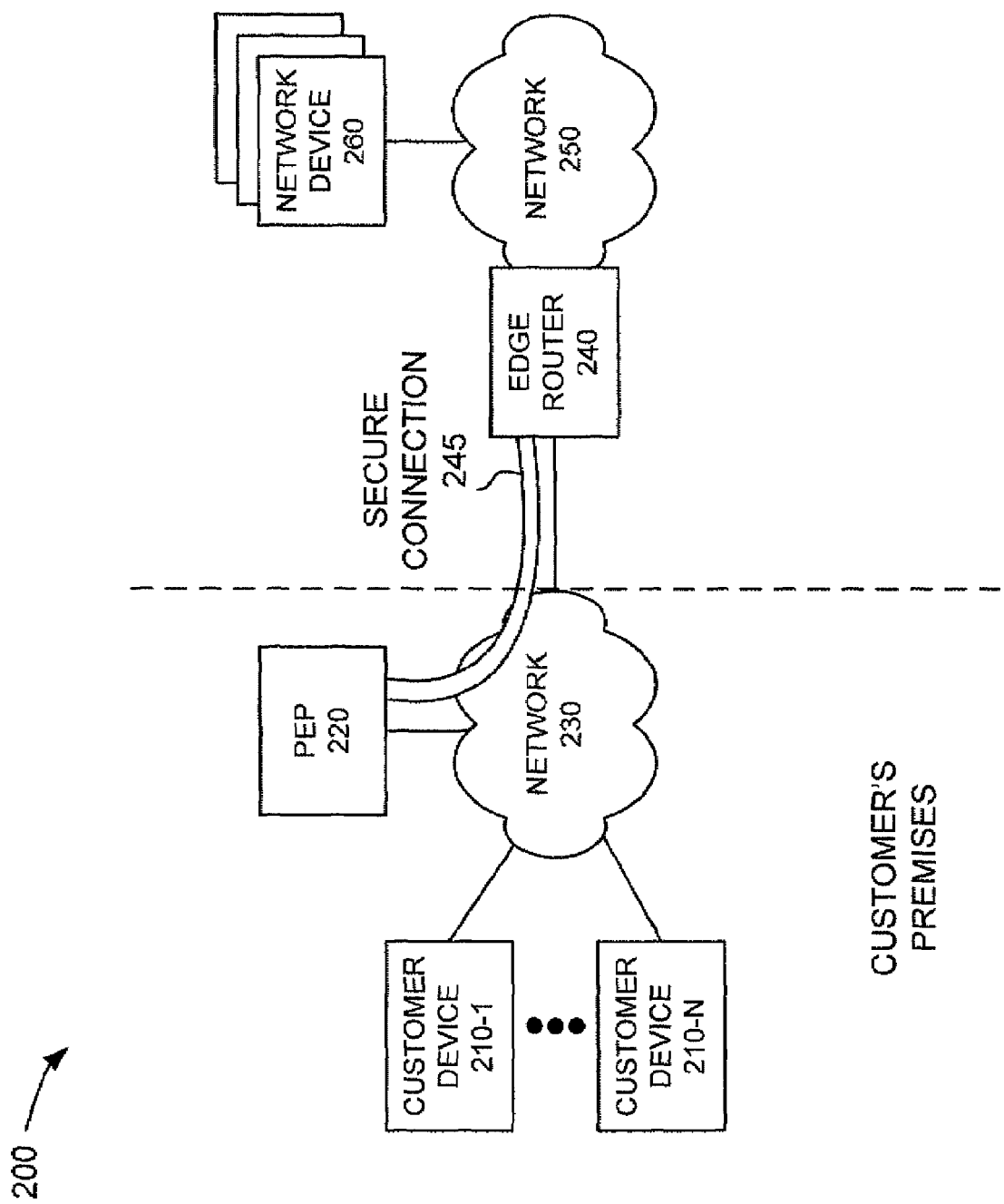
FIG. 2 illustrates an exemplary system in which systems and methods, consistent with principles of the invention, may be implemented.

FIG. 2 is an exemplary diagram of a system 200 in which systems and methods consistent with principles of the invention may be implemented. System 200 may include multiple customer devices 210-1 to 210-N (referred to collectively as "customer devices 210") connected to a policy enforcement point (PEP) 220 via a network 230, which, collectively, may be part of the customer's premises. The customer's premises may connect to network devices 260 via an edge router 240 associated with a network 250. The number of customer devices 210, PEPs 220, networks 230 and 250, edge routers 240, and network devices 260 illustrated in FIG. 2 is provided for simplicity. In practice, there may be more or fewer customer devices, PEPs, networks, edge routers, and network devices.

Customer devices 210 may include devices, such as, for example, a computer device (e.g., a personal computer, a lap top, etc.), a telephone (e.g., a plain old telephone system (POTS) telephone, a Session Initiation Protocol (SIP) telephone, etc.), a television, a set-top box, and/or another type of device capable of transmitting and/or receiving traffic (which may include signaling traffic and/or bearer/media traffic). The traffic may include, for example, voice communications, data communications (such as IM or e-mail communications), documents from a network (such as the Internet), television broadcasts, signaling used to establish any of the foregoing, etc.

PEP 220 may include an entity that monitors traffic entering or leaving the customer's premises and enforces policies on the traffic. In one exemplary implementation, PEP 220 may include a stand-alone device. In another exemplary implementation, PEP 220 may be implemented within another device in the customer's premises. For example, PEP 220 may be implemented within a router (e.g., a wired or wireless router), a modem (e.g., a digital subscriber line (DSL) modem, a dialup modem, etc.), an optical network terminal (ONT), a computer device (e.g., a personal computer, lap top, etc.), or another device.

Network 230 may include a local area network (LAN) or another type of network. Customer devices 210 and PEP 220 may connect to network 230 via wired, wireless, and/or optical connections.

Edge router 240 may include one or more devices that generally function to connect devices, such as devices within the customer's premises, to network 250. In one exemplary implementation, a secure connection 245 may be established between edge router 240 and PEP 220. Secure connection 245 may include, for example, an Internet Protocol (IP) Security (IPSec) tunnel, a Virtual Private Network (VPN) connection, or another type of secure connection.

Network 250 may include a LAN, a wide area network (WAN), a telephone network, such as the Public Switched Telephone Network (PSTN), an intranet, the Internet, or a combination of networks.

Network device 260 may include one or more devices to which traffic may be transmitted or received. For example, network device 260 may include one or more servers that gather, process, search, and/or maintain documents (e.g., web pages), personal computers, lap tops, personal digital assistants (PDAs), wireless telephones, POTS telephones, SIP telephones, television broadcast provisioning devices, etc.

Figure 3:
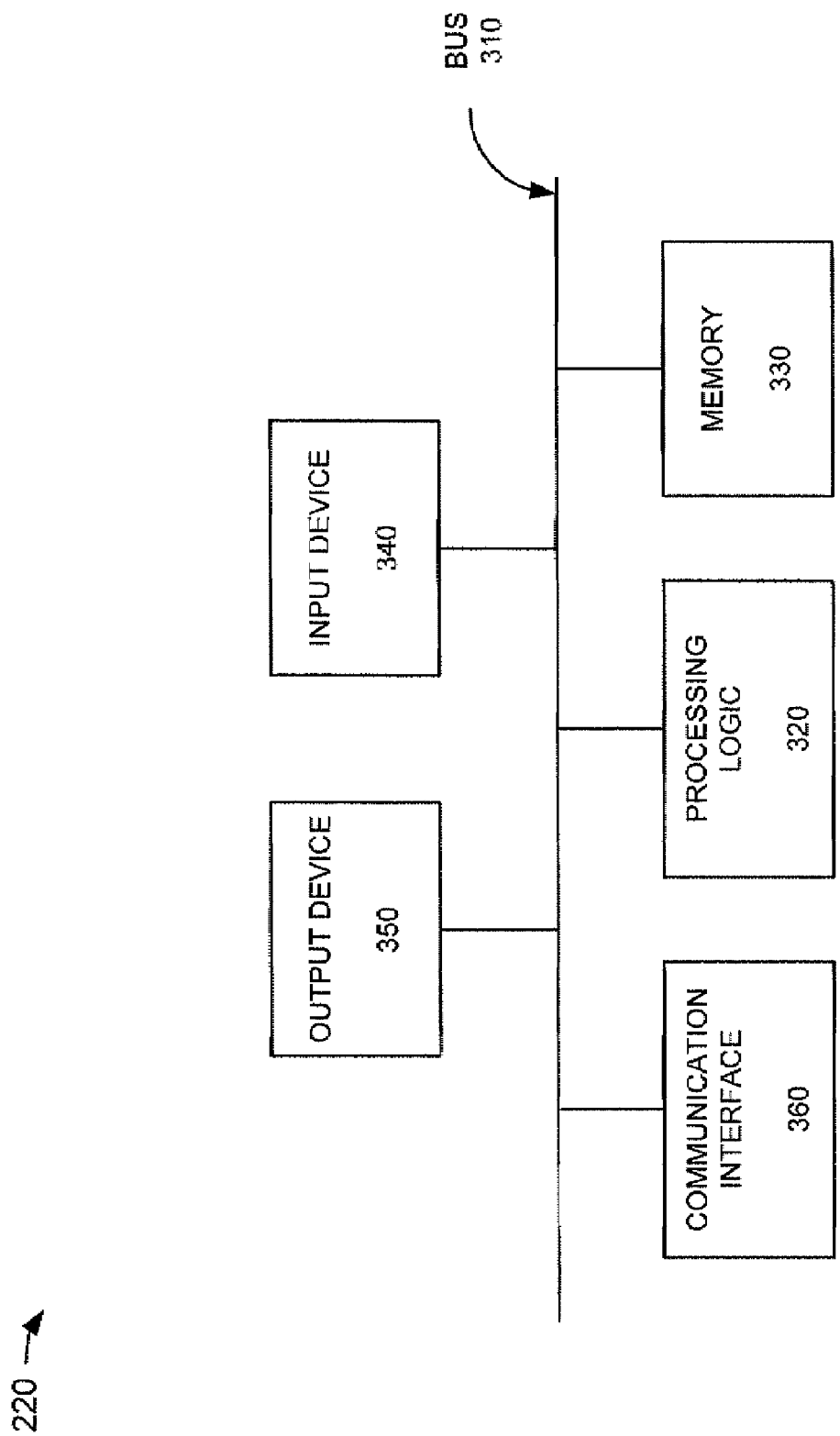
FIG. 3 illustrates an exemplary configuration of the policy enforcement point of FIG. 2.

FIG. 3 is an exemplary diagram of PEP 220 in one implementation consistent with principles of the invention. Edge router 240 may be similarly configured. As illustrated, PEP 220 may include a bus 310, processing logic 320, a memory 330 (both transient and persistent), an input device 340, an output device 350, and a communication interface 360. It will be appreciated that PEP 220 may include additional (or other) components than illustrated in FIG. 3. Moreover, other configurations are possible. For example, in other implementations, PEP 220 may be implemented in software within any device capable of providing a service logic execution environment (SLEE) where policy decisions are rendered, that includes a persistent store for policy definitions, storage for an accounting of the decisions made within the SLEE, and input and output connections for receiving and delivering network traffic, respectively.

Bus 310 may include a path that permits communication among the elements of PEP 220. Processing logic 320 may include a processor, microprocessor, or other type of processing logic, such as a application specific integrated circuit (ASIC), field programmable gate array (FPGA), etc., that may interpret and execute instructions. Memory 330 may include a random access memory (RAM) or another type of dynamic storage device that may store information and instructions for execution by processing logic 320, a read only memory (ROM) or another type of static storage device that may store static information and instructions for use by processing logic 320, and/or a magnetic and/or optical recording medium and its corresponding drive.

Input device 340 may include a mechanism that permits a customer to input information to PEP 220, such as a keyboard, a mouse, a pen, voice recognition and/or biometric mechanisms, etc. Output device 350 may include a mechanism that outputs information to the customer, including a display, a printer, a speaker, etc. Communication interface 360 may include any transceiver-like mechanism that enables PEP 220 to communicate with other devices and/or systems. For example, communication interface 360 may include mechanisms for communicating with another device via a network, such as network 230. Moreover, in one implementation consistent with principles of the invention, communication interface 360 may include mechanisms that enable PEP 220 to establish a secure connection (e.g., secure connection 245) with a device (e.g., edge router 240) associated with an external network, such as network 250.

As will be described in detail below, PEP 220, consistent with principles of the invention, may perform certain policy-related operations. PEP 220 may perform these operations in response to processing logic 320 executing software instructions contained in a computer-readable medium, such as memory 330. A computer-readable medium may be defined as a physical or logical memory device and/or carrier wave.

The software instructions may be read into memory 330 from another computer-readable medium or from another device via communication interface 360. The software instructions contained in memory 330 may cause processing logic 320 to perform processes that will be described later. Alternatively, hardwired circuitry may be used in place of or in combination with software instructions to implement processes consistent with principles of the invention. Thus, implementations consistent with principles of the invention are not limited to any specific combination of hardware circuitry and software.

Figure 4:
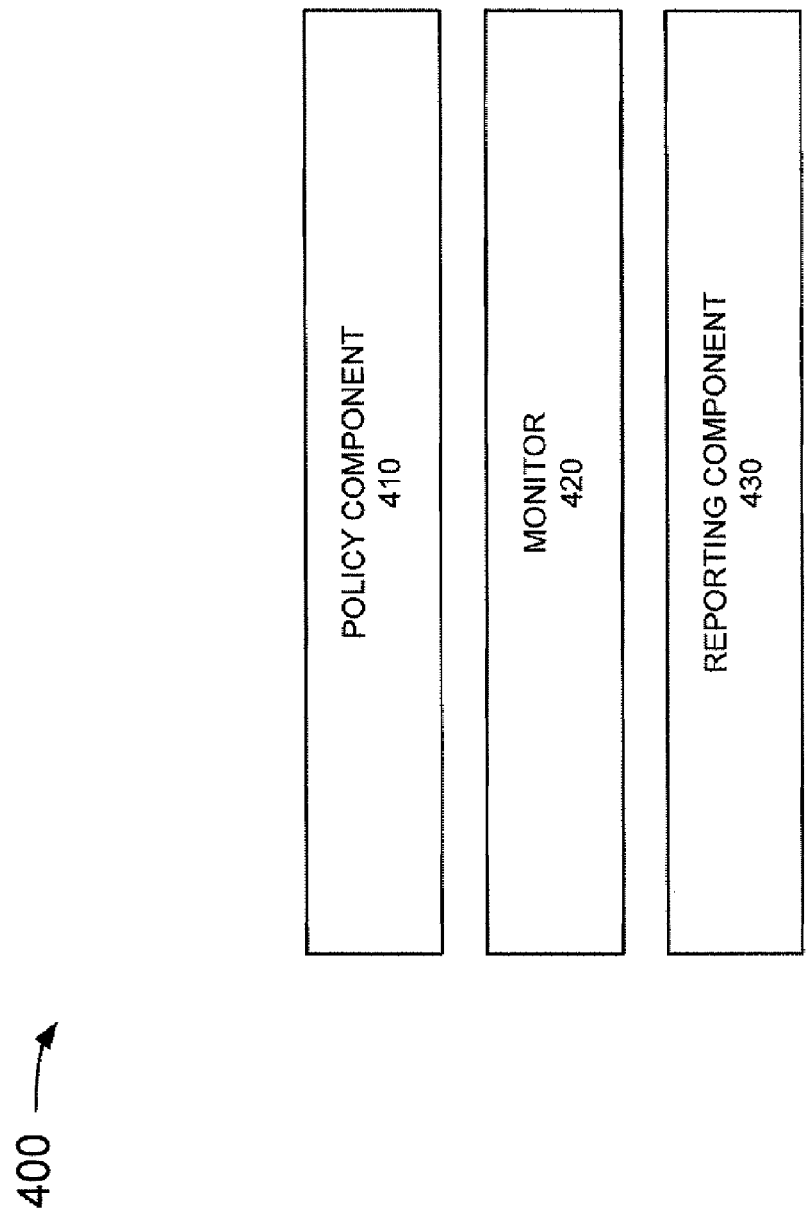
FIG. 4 illustrates a portion of an exemplary computer-readable medium that may be associated with the policy enforcement point of FIG. 2.

FIG. 4 is a diagram of a portion of an exemplary computer-readable medium that may be associated with PEP 220 in an implementation consistent with principles of the invention. In one implementation, computer-readable medium 400 may correspond to memory 330 of PEP 220. The portion of computer-readable medium 400 illustrated in FIG. 4 may include a policy component 410, a monitor 420, and a reporting component 430.

Policy component 410 may store policies to be applied to traffic entering or leaving the customer's premises. Policy component 410 may provide, in one implementation consistent with principles of the invention, one or more graphical user interfaces that allow the customer to define policies. Policy component 410 may allow only authenticated and authorized access to add policies, change policies, and/or view policies. A user may be allowed to perform all of these actions, some of the actions, or none of these actions. In addition, policies may be identified by application type (e.g., video content, IM, or email) and action upon that type (e.g., block, modify, or record-only). User authentication and authorization for defining and viewing policies may be associated with any or all such policy attributes. In some implementations, a particular end user, such as a head of household, may have access to any or all policies, including the definition of who is authorized to engage which applications and the actions allowed against those applications. In some implementations, policy component 410 may receive one or more sets of pre-defined policies from a network device 260. Policy component 410 may also provide one or more graphical user interfaces to allow the customer to modify and/or delete any of the stored policies.

Different policies may be defined for the different types of customer devices 210 in the customer's premises or different communication mechanisms in the customer's premises. For example, with respect to obtaining documents from the Internet, policies may be defined to, for example, block all access to a particular site, block documents containing particular content, block documents based on the direction that the document is being transmitted (e.g., from the customers premises or to the customers premises), block documents based on the size of the documents, block documents based on the name of the documents, block documents based on the type of documents, etc. Policies may also be defined, for example, for instant messaging (e.g., to restrict instant messaging based on time of day, based on the IM destination (or origination), based on the content of an instant message, etc.), Voice over IP (e.g., SIP) communications (e.g., to restrict communications based on source/destination, time of day, domain, etc.), peer-to-peer transmissions (e.g., to restrict transmissions based on source/destination, etc.), e-mail transmissions (e.g., to restrict transmissions based on source/destination, time of day, attachments, words in the e-mail transmissions, etc.), streaming media (e.g., to restrict media based on time of day, ratings, etc.), and/or other types of traffic.

The policies may indicate a particular time of day, day of week, etc. at which the policies are to be applied. The policies may indicate particular customer devices 210 to which the policies are to be applied. The policies may also indicate particular individuals to which the policies are to be applied.

Monitor 420 may include software that receives traffic from a customer device 210-1 to 210-N via network 230 or edge router 240 via secure connection 245 and analyzes the traffic to determine whether any of the policies stored in policy component 410 applies to the received traffic. If a policy applies to the received traffic, monitor 420 may discard the traffic (e.g., prevent the traffic from reaching a customer device 210-1 through 210-N or edge router 240). Monitor 420 may also record information regarding the traffic entering and/or leaving the customers premises. In one implementation consistent with principles of the invention, monitor may record information regarding only that traffic to which a policy applies. The recorded information may include, for example, information identifying the particular customer device to which the traffic is destined or from which the traffic was received, the identity of the individual associated with the particular customer device, the time and date that the traffic was received, and/or information relating to the traffic (e.g., information identifying the traffic, such as an instant message). The recorded information may include other information than identified above, such as information regarding the particular policy that applies to the received traffic.

Reporting component 430 may include software that generates reports and provides reports to the customer. In one implementation consistent with principles of the invention, reporting component 430 may generate the reports automatically (e.g., on a daily, weekly, monthly, etc. basis) or in response to a request from the customer. The report may include all or a subset of the information recorded by monitor 420.

Figure 5:
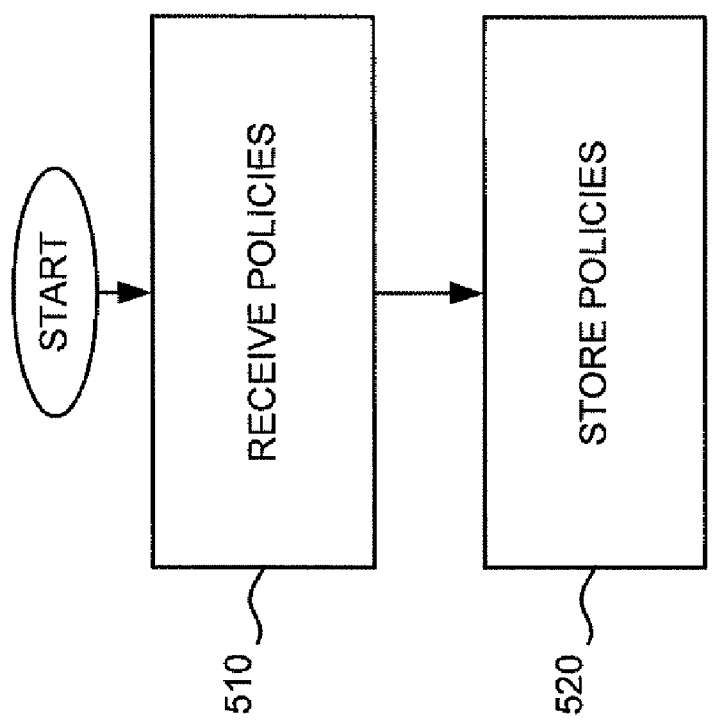
FIGS. 5-9 illustrate flow charts of exemplary processing according to implementations consistent with principles of the invention.

FIG. 5 is a flow chart of an exemplary process for obtaining policies in an implementation consistent with principles of the invention. The processing of FIG. 5 may be performed by one or more software and/or hardware components within PEP 220 (e.g., policy component 410). In another implementation, some or all of the processing may be performed by one or more software and/or hardware components within another device or a group of devices separate from or including PEP 220 (e.g., a device to which PEP 220 may access to retrieve policies).

Processing may begin with one or more policies being received (block 510). PEP 220 may receive the one or more policies directly from the customer. For example, PEP 220 may provide one or more graphical user interfaces to the customer to allow the customer to define policies. In addition or alternatively, PEP 220 may receive one or more policies from another source. For example, one or more policies may be downloaded to PEP 220 from a network device that provides policies. The downloading may occur in response to an input by the customer (e.g., indicating a uniform resource locator (ULR) of a network device from which the one or more policies are to be downloaded). In some implementations, the customer may subscribe to a policy service in which policies are periodically downloaded to PEP 220. PEP 220 may allow the customer to modify and/or delete policies at any time. In one implementation consistent with principles of the invention, a PEP 220 may allow only authorized customers to define/modify/delete policies (e.g., to prevent children in the household from accessing the policies defined by the children's parents).

Once a policy has been defined, PEP 220 may store the policy (block 520). For example, PEP 220 may store the policy in policy component 410.

Figure 6:
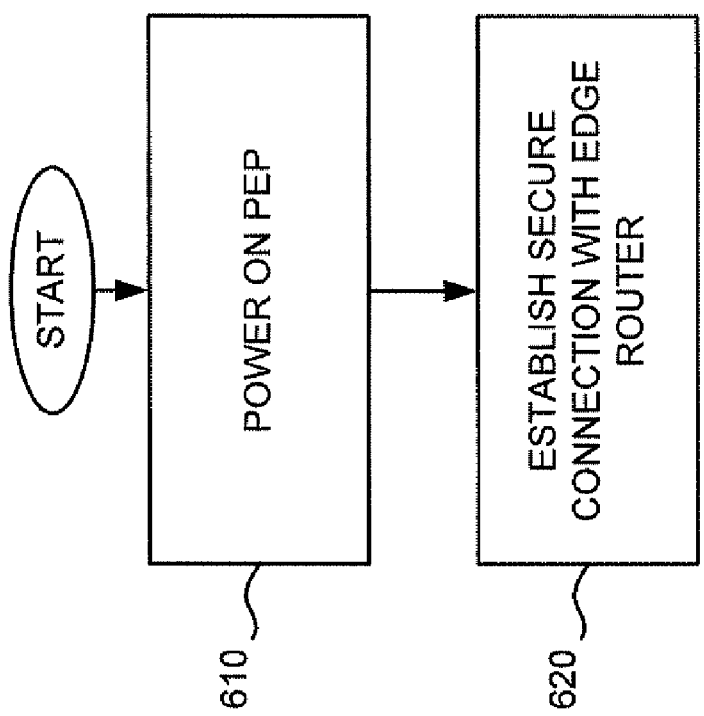

FIG. 6 is a flow chart of an exemplary process for configuring PEP 220 in an implementation consistent with principles of the invention. Processing may begin with PEP 220 being powered up (block 610). Once powered up, PEP 220 may automatically establish a secure connection 245, such as an IPSec tunnel, with edge router 240 (block 620). To establish secure connection 245, PEP 220 and edge router 240 may exchange signaling information in a known manner. For example, PEP 220 and edge router 240 may agree on the type of authentication and encryption, the encryption keys, and other parameters to be used for secure connection 245. Once secure connection 245 is established, the customer premises may receive traffic from network 250 and transmit traffic to network 250.

Figure 7:
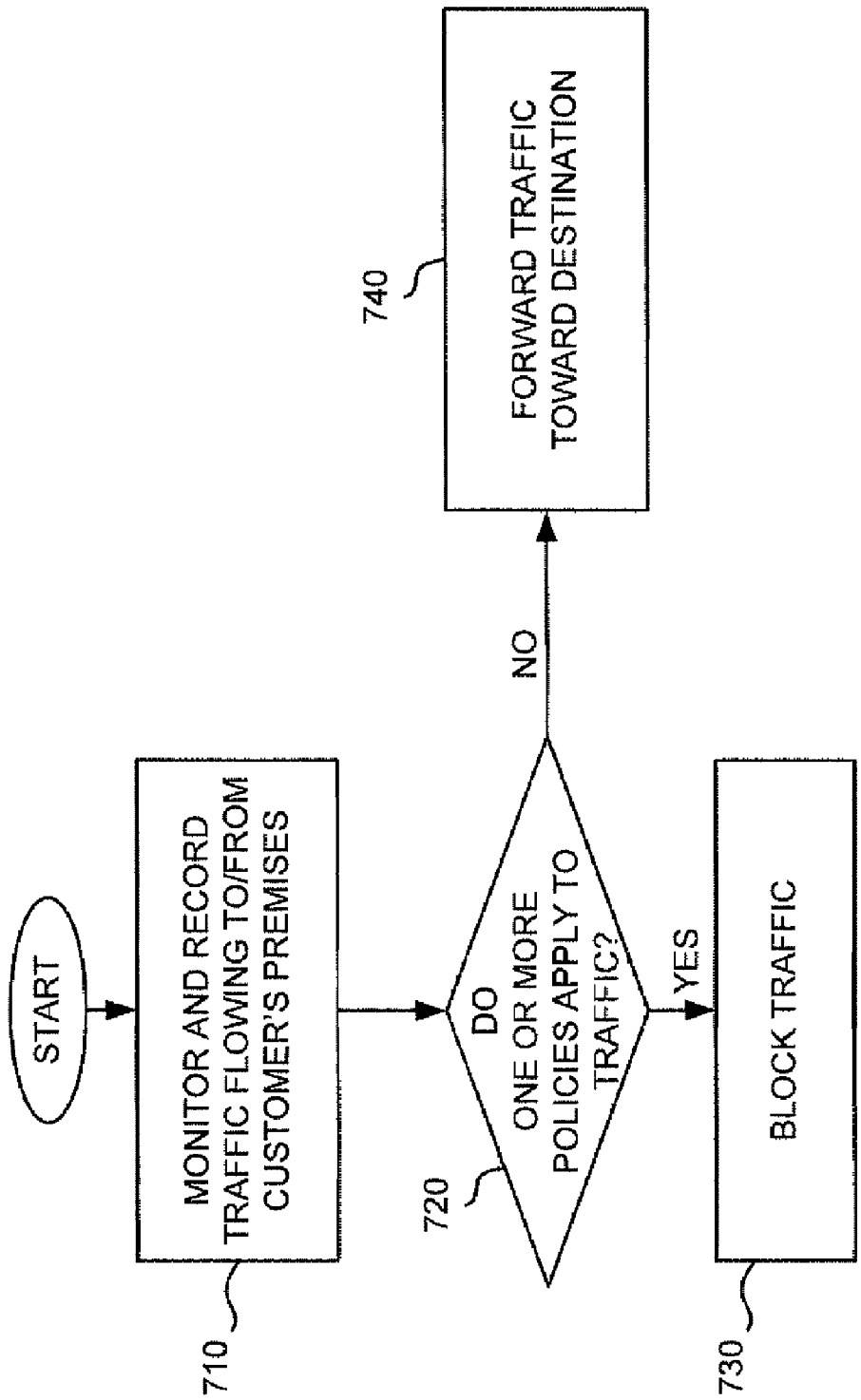

FIG. 7 is a flow chart of an exemplary process for applying a policy to traffic in an implementation consistent with principles of the invention. The processing of FIG. 7 may be performed by one or more software and/or hardware components within PEP 220 (e.g., monitor 420). In another implementation, some of the processing may be performed by one or more software and/or hardware components within another device or a group of devices separate from or including PEP 220.

Processing may begin with PEP 220 monitoring and possibly recording traffic flowing to/from the customer's premises (block 710). As indicated above, traffic entering and leaving the customer's premises is received by PEP 220. PEP 220 may receive traffic, for example, from a customer device 210-1 through 210-N via network 230 or from edge router 240 via secure connection 245.

PEP 220 may analyze the traffic to determine whether one or more policies apply to the received traffic (block 720). A policy may apply to received traffic based, for example, on the time of day (e.g., a policy could deny all Internet access at certain times of the day), based on the content of the traffic, based on the particular customer device to which or from which the traffic is received, based on the individual associated with the particular customer device to which or from which the traffic is received, and/or based on other information.

If one or more policies apply to the received traffic (block 720, YES), PEP 220 may take action on (e.g., block, reroute, record, etc.) the traffic (block 730). For example, PEP 220 may discard the traffic thereby preventing the traffic from reaching the destination customer device 210-1 through 210-N within the customer's premises or from reaching edge router 240.

If, on the other hand, PEP 220 determines that no policy applies to the received traffic (block 720, NO), PEP 220 may forward the traffic toward its destination (block 740). For example, PEP 220 may forward the traffic to the appropriate customer device 210-1 through 210-N in the customer premises. Alternatively, PEP 220 may forward the traffic to edge router 240 via secure connection 245.

Figure 8:
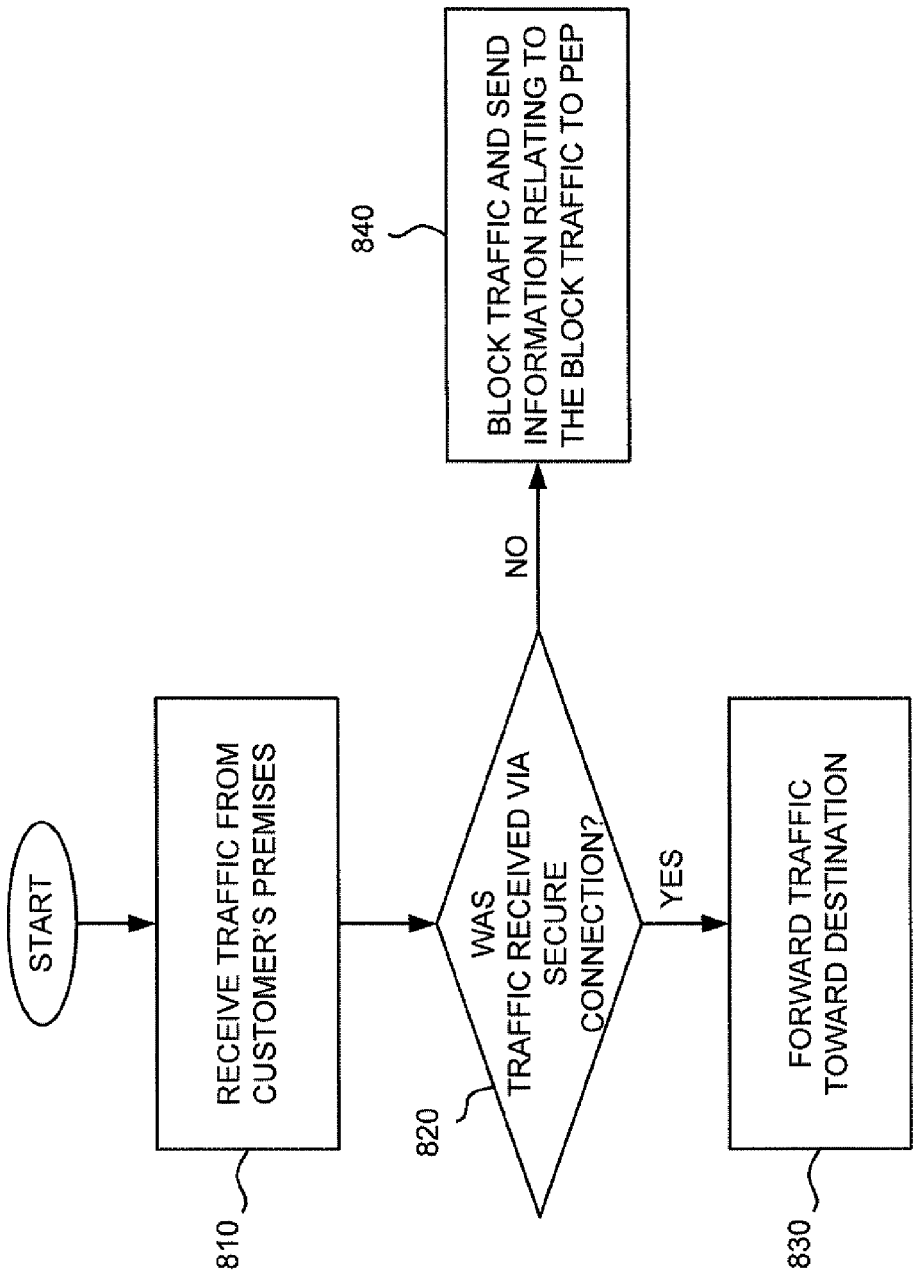

FIG. 8 is a flow chart of an exemplary process for processing traffic from the customer's premises in an implementation consistent with principles of the invention. The processing of FIG. 8 may be performed by one or more software and/or hardware components within edge router 240. In another implementation, some of the processing may be performed by one or more software and/or hardware components within another device or a group of devices separate from or including edge router 240.

Processing may begin with edge router 240 receiving traffic from the customer's premises (block 810). Edge router 240 may identify traffic as originating from the customer's premises based, for example, on header information associated with the traffic.

Edge router 240 may determine if the traffic was received via secure connection 245 (block 820). Edge router 240 may make this determination based, for example, on information (e.g., header information) associated with the traffic.

If the traffic was received via secure connection 245 (block 820, YES), edge router 240 may forward the traffic toward its destination (block 830). For example, edge router 240 may forward the traffic toward an appropriate network device 260 via network 250.

If the traffic was not received via secure connection 245 (block 820, NO), edge router 240 may block the traffic (block 840). For example, edge router 240 may discard the traffic. Edge router 240 may also transmit information relating to the discarded traffic to PEP 220 via secure connection 245 (block 840). The information may include information identifying the customer device from which the traffic was received, the date and time that the traffic was received, information relating to the traffic, and/or other information.

Figure 9:
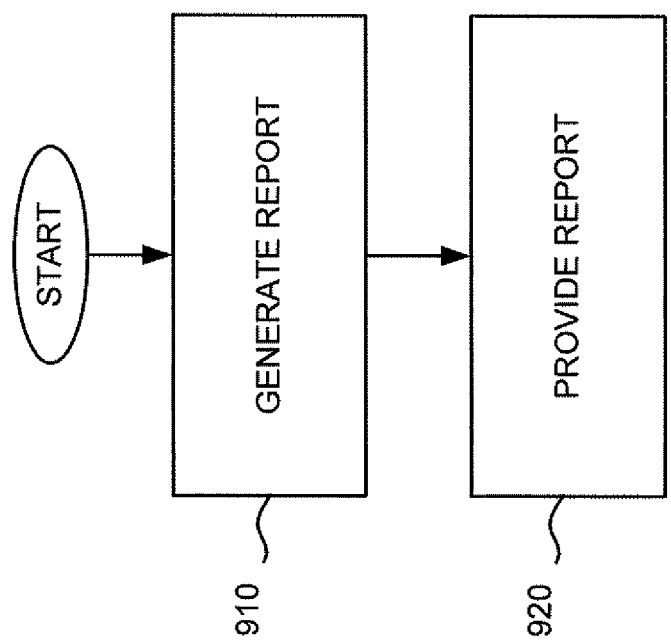

FIG. 9 is a flow chart of an exemplary process for generating reports in an implementation consistent with principles of the invention. The processing of FIG. 9 may be performed by one or more software and/or hardware components within PEP 220 (e.g., reporting component 430). In another implementation, some or all of the processing may be performed by one or more software and/or hardware components within another device or a group of devices separate from or including PEP 220.

Figure 10:
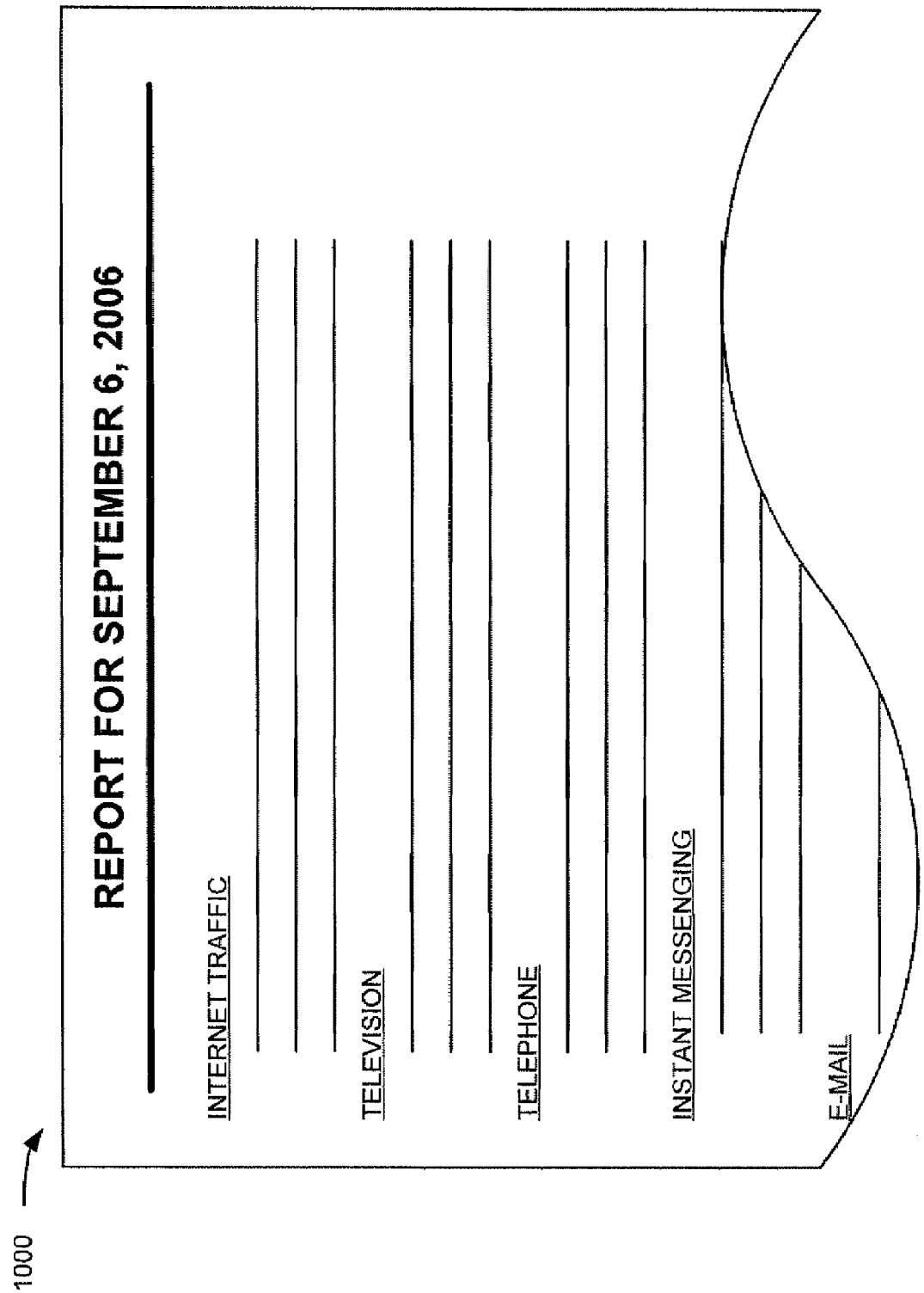
FIG. 10 illustrates an exemplary report that may be generated in one implementation consistent with principles of the invention.

Processing may begin with PEP 220 generating a report (block 910). PEP 220 may generate the report in response to a request received from the customer. In some implementations consistent with principles of the invention, PEP 220 may authenticate the customer in response to receiving the request and only generate the report based on the customer being properly authenticated. In one implementation, PEP 220 may generate the report automatically (e.g., at predetermined intervals). PEP 220 may deliver the report, or portion of the report, or specific events logged in the report whose type may be defined by the administrator to the administrator of PEP 220 or the administrator of a specific policy profile FIG. 10 illustrates an exemplary report 1000 that may be generated by PEP 220. As illustrated, report 1000 is generated based on traffic received on a single day. It will be appreciated that reports can be generated for any time period (an hour, a day, a week, a month, etc.). Report 1000 may include information regarding the traffic that has been received by PEP 220 during the time period. For example, as illustrated in FIG. 10, report 1000 provides information regarding Internet traffic that has been transmitted/received during the time period, television broadcasts that have been received during the time period, telephone calls to or from the customer's premises during the time period, instant messages that have been transmitted/received during the time period, e-mail messages that have been transmitted/received during the time period, etc. Report 1000 may include all traffic received during the time period or only that traffic to which a policy has been applied during the time period.

PEP 220 may provide the generated report to the customer (block 920). For example, PEP 220 may provide the generated report to a display device, a printer, or other device.

CONCLUSION

Implementations described herein provide a policy enforcement point within a customer's premises. A secure connection may be established between the policy enforcement point and an external network. Traffic to/from the customer's premises that does not pass through the secure connection may be discarded, thus ensuring that all traffic to/from the external network pass through the policy enforcement point. In this way, the policy enforcement point may enforce customer-defined policies with respect to all traffic entering or leaving the customer's premises.

The foregoing description of exemplary implementations provides illustration and description, but is not intended to be exhaustive or to limit the invention to the precise form disclosed. Modifications and variations are possible in light of the above teachings or may be acquired from practice of the invention. For example, while series of acts have been described with respect to FIGS. 5-9, the order of the acts may be varied in other implementations consistent with the invention. Moreover, non-dependent acts may be implemented in parallel.

It will be apparent to one of ordinary skill in the art that aspects of the invention, as described above, may be implemented in many different forms of software, firmware, and hardware in the implementations illustrated in the figures. The actual software code or specialized control hardware used to implement aspects consistent with the principles of the invention is not limiting of the invention. Thus, the operation and behavior of the aspects of the invention were described without reference to the specific software code—it being understood that one of ordinary skill in the art would be able to design software and control hardware to implement the aspects based on the description herein.

Further, certain portions of the invention may be implemented as "logic" that performs one or more functions. This logic may include hardware, such as an application specific integrated circuit, a field programmable gate array, a processor, or a microprocessor, software, or a combination of hardware and software.

No element, act, or instruction used in the description of the present application should be construed as critical or essential to the invention unless explicitly described as such. Also, as used herein, the article "a" is intended to include one or more items. Where only one item is intended, the term "one" or similar language is used. Further, the phrase "based on" is intended to mean "based, at least in part, on" unless explicitly stated otherwise.

What is claimed is:

1. A device comprising:
a memory to:
store a plurality of policies, the plurality of policies including different policies for different types of devices associated with a first network associated with the device; and
a processor to:
receive traffic transmitted between a first device and a second device, where the first device is associated with the first network and the second device is associated with a second network, and where the first network and the second network are connected by a secure connection and a non-secure connection,
determine a type, of the different types of devices, associated with the first device,
identify a policy, of the plurality of policies, to apply to the received traffic based on the determined type associated with the first device, and
apply the identified policy to the received traffic, where the processor, when applying the identified policy, is further to:
determine whether the received traffic is transmitted between the first network and the second network via the secure connection or via the non-secure connection, and
discard, based on the identified policy, the received traffic when the traffic is transmitted along the non-secure connection between the first network and the second network.

2. The device claim 1, where the second device includes an edge router.

3. The device of claim 1, where the first device includes at least one of a computer device, a set-top box, a television, or a telephone device.

4. The device of claim 1, where the processor is further to:
record information relating to the received traffic.

5. The device of claim 4, where the processor is further to:
generate a report using the recorded information.

6. The device of claim 1, where processor is further to:
forward the received traffic towards an intended destination when the received traffic is transmitted along the secure connection.

7. The device of claim 1, where the first device and first network are associated with a customer, and
where the plurality of policies includes:
a plurality of customer-defined policies.

8. The device of claim 1, where the processor is further to:
automatically establish the secure connection in response to the device powering up.

9. The device of claim 4, where the processor, when recording information relating to the received traffic, is further to:
identify, based on the identified policy, the information relating to the received traffic.

10. A method comprising:
receiving, at a policy enforcement point located within a first network, traffic between a first device and a second network, where the first device is located within the first network and the second network is external to the first network, where the first network and the second network are connected by at least a secure connection and a non-secure connection;
determining whether the received traffic is associated with the secure connection or the non-secure connection;
determining, by the policy enforcement point, whether a policy applies to the received traffic based on one or more attributes of the first device, where the one or more attributes include a type of the first device; and
discarding, by the policy enforcement point, the received traffic when the policy applies to the received traffic and when the received traffic is associated with the non-secure connection.

11. The method of claim 10, where the traffic includes at least one of a request for a web page, an instant message, an e-mail, a file transfer, or a request for a television program.

12. The method of claim 10, further comprising:
forwarding, by the policy enforcement point, the received traffic toward an intended destination in response to determining that the policy does not apply to the received traffic or in response to determining that the received traffic is associated with the secure connection.

13. The method of claim 10, further comprising:
recording, by the policy enforcement point, information relating to the received traffic.

14. The method of claim 10, further comprising:
recording, by the policy enforcement point, information relating to the received traffic when the policy applies to the received traffic.

15. The method of claim 10, further comprising:
discarding, by the second device, the traffic when the second device receives the traffic from the first device via the non-secure connection.

16. The method of claim 15, where the second device includes a router.

17. The method of claim 10, where the received traffic includes a request to establish a telephone call between the first device and the second device.

18. A system comprising:
a policy enforcement point, located within a first network, where the policy enforcement point is to:
monitor traffic entering or leaving the first network via a non-secure connection,
identify a device, in the first network, associated with the monitored traffic,
determine, based on the identified device, whether to apply a policy to the monitored traffic, and
redirecting, in response to determining to apply the policy, the monitored traffic to the secure connection between the first network and a second network; and
an edge router, associated with the second network, where the edge router is to:
connect to the policy enforcement point via the secure connection and the non-secure connection, and
discard traffic, from the first network, when the traffic is received over the non-secure connection.

19. The system of claim 18, where the monitored traffic includes at least one of a request for a web page, an instant message, an e-mail, a file transfer, a request for a television program, or a request to establish a telephone call.

20. The system of claim 18, where the policy enforcement point is further to:
record information relating to monitored traffic in response to determining to apply the policy to the monitored traffic.

21. The system of claim 20, where the policy enforcement point is further to:
generate a report using the recorded information.

22. The system of claim 18, where the policy enforcement point is further to:
discard the monitored traffic in response to determining to not apply the policy to the monitored traffic.

* * * * *